United States Patent
Marchesini (10) Patent No.: US 10,759,609 B2
(45) Date of Patent: Sep. 1, 2020

(54) SCREW CONVEYOR TO CONVEY POWDERY MATERIAL, IN PARTICULAR CEMENT OR THE LIKE

(71) Applicant: WAMGROUP S.p.A., Modena (IT)

(72) Inventor: Vainer Marchesini, San Prospero (IT)

(73) Assignee: WAMGROUP S.P.A., Modena (IT)

( * ) Notice: Subject to any disclaimer, the term of this patent is extended or adjusted under 35 U.S.C. 154(b) by 0 days.

(21) Appl. No.: 16/337,090

(22) PCT Filed: Sep. 29, 2017

(86) PCT No.: PCT/IB2017/056026
§ 371 (c)(1),
(2) Date: Mar. 27, 2019

(87) PCT Pub. No.: WO2018/060955
PCT Pub. Date: Apr. 5, 2018

(65) Prior Publication Data
US 2020/0031585 A1    Jan. 30, 2020

(30) Foreign Application Priority Data
Sep. 29, 2016  (IT) .................. 102016000097907

(51) Int. Cl.
*B65G 53/48* (2006.01)
*B65G 65/46* (2006.01)
(Continued)

(52) U.S. Cl.
CPC ........... *B65G 33/14* (2013.01); *B65G 33/265* (2013.01)

(58) Field of Classification Search
None
See application file for complete search history.

(56) References Cited

U.S. PATENT DOCUMENTS

| 1,423,698 A | 7/1922 | Thurston |
| 2,507,245 A | 5/1950 | Dady |
| (Continued) | | |

FOREIGN PATENT DOCUMENTS

| DE | 10 85 812 | 7/1960 |
| EP | 0 110 694 | 6/1984 |
| (Continued) | | |

*Primary Examiner* — Kavel Singh
(74) *Attorney, Agent, or Firm* — Leason Ellis LLP (57) ABSTRACT

A screw conveyor to convey powdery material, in particular cement. The screw conveyor comprises:
 a transfer screw; and
 a trough containing the transfer screw; the trough being provided with an inlet section and an outlet section of the powdery material.
The screw conveyor is characterized in that the screw comprises:
 at least a first screw portion having a first law of continuous variation of the pitches of the screw, which can be graphically represented by means of a first function having in at least one stretch a first derivative other than zero; and
 at least a second screw portion having a second law of continuous variation of the pitches of the screw, which can be graphically represented by a second function having in at least one stretch a first derivative other than zero. The first law of continuous variation of the pitches is different from the second law of continuous variation of the pitches.

10 Claims, 5 Drawing Sheets

(51) Int. Cl.
*B65G 33/14* (2006.01)
*B65G 33/26* (2006.01)

(56) References Cited

U.S. PATENT DOCUMENTS

| | | | |
|---|---|---|---|
| 3,056,487 A | 10/1962 | Kipper | |
| 8,926,231 B2* | 1/2015 | Liu | ............................ C10J 3/30 |
| | | | 406/53 |
| 2005/0081766 A1* | 4/2005 | McIntosh | .................. F23K 3/14 |
| | | | 110/286 |
| 2011/0072723 A1 | 3/2011 | Liu et al. | |

FOREIGN PATENT DOCUMENTS

| | | |
|---|---|---|
| EP | 0 816 938 | 1/1998 |
| JP | S55-135020 | 10/1980 |
| JP | H07 304511 | 11/1995 |
| JP | H09 303922 | 11/1997 |
| JP | H10 149005 | 6/1998 |
| JP | H11 79356 | 3/1999 |
| JP | H11 254193 | 9/1999 |
| JP | H11 314728 | 11/1999 |
| JP | 2010 222881 | 10/2010 |
| RU | 2117617 | 8/1998 |
| WO | WO 94/07780 | 4/1994 |

* cited by examiner

SCREW CONVEYOR TO CONVEY POWDERY MATERIAL, IN PARTICULAR CEMENT OR THE LIKE

CROSS-REFERENCE TO RELATED PATENT APPLICATIONS

This application is a U.S. National Phase Application under 35 U.S.C. § 371 of International Patent Application No. PCT/IB2017/056026, filed Sep. 29, 2017, which claims the priority of Italian Application No. 102016000097907, filed Sep. 29, 2016, which is incorporated by reference as if expressly set forth in its entirety herein.

TECHNICAL FIELD

The present invention relates to a screw conveyor to convey a powdery material, in particular cement or the like.

In fact, this screw conveyor is also suitable for conveying other quasi-fluid "sliding products", which, in use, reach the screw conveyor when they have already been aerated, such as, e.g. cements, limes, fillers and the like.

Therefore, what follows cannot be applied to materials such as sand and gravel, which are not sliding products in the aforementioned sense.

BACKGROUND ART

It is well known in the art that such sliding products (cements, limes, fillers, etc.) are normally contained in silos that are internally provided with one or more devices (such as one or more compressed air jets) for fluidizing with a gas the powdery product even before its entry into the trough of the screw conveyor.

Therefore, the term "aeration" refers here to the properties of certain materials composed of fine particles (such as, e.g. cements, limes, fillers, etc.) in whose mass the particles are separated by means of the absorption and the distribution of fluidizing air.

For those reasons, the density of the materials during use is reduced, and the particulate/gas mixture temporarily exhibits some of its fluid properties.

Usually, the greater the aeration, the greater the fluidity of the aerated mass.

Moreover, it is already known that the chance that such an aerated material has quasi-fluid behaviours is inversely proportional to the size of the particles forming the material mass.

In some embodiments, the blowing of fluidizing air into the material may go together with mechanical or pneumatic vibrations induced in the material mass to obtain a quasi-fluid behaviour.

Moreover, it is well known that, beside air, other gases may be used to give appreciable fluidity to the powdery material such as, e.g. nitrogen, carbon dioxide, etc. However, it has been found that the efficiency of the system increases by limiting as much as possible the turbulence within the quasi-fluid.

In this regard, it has been experimentally found that the turbulence is directly proportional to the discrete jumps of the conveyor screw pitch; in this sense, also the welding of single screw stretches represents discrete jumps with a consequent loss of efficiency of the conveyor device.

Therefore, there is a need for studies aiming to the making of conveyor screws (also known as "Archimedes screws") designed to convey aerated powdery materials with an optimal power consumption, which is significantly lower than that of current devices.

Therefore, one of the objects of the present invention is the reduction of the power absorbed by the device when conveying the material through a series of structural approaches.

Normally, in prior art embodiments, the entire screw conveyor has the same pitch at any point.

However, a recent thorough study of mechanical and fluid-dynamic phenomena occurring within the screw conveyor has shown the importance of dividing the screw conveyor into screw portions with different functional characteristics with the aim of maximizing the efficiency of each screw portion.

Therefore, screw conveyors have been created that are divided into screw portions, arranged in series, with different geometric characteristics; each screw portion having a constant pitch other than the one of the previous screw portion and the one of the next screw portion.

In such newly conceived embodiments, the different screw portions have different pitches to perform particular functions such as extracting, compacting and conveying the material.

For example, EP-A2-0 816 938 (MITA INDUSTRIAL Co. LTD) discloses a solution involving the use of different screw portions with different pitches, arranged in series. However, each screw portion has the same pitch at any point.

However, in spite of some positive aspects, these solutions do not solve the problem of minimizing the power consumption to convey powdery material and maximizing the filling of the spires.

It has also been noted that if transfer screws made according to the teaching of EP-A2-0 816 938 (MITA INDUSTRIAL CO. LTD) are sloping at a certain angle (e.g. to lift the powdery material from the ground to the floor of a building) they show a low efficiency (power loss) in conveying the powdery material.

Moreover, U.S. Pat. No. 3,056,487 (KIPPER) discloses a transfer screw to convey a fibrous waste material deriving, e.g. from sugar cane processing.

The screw conveyor described in U.S. Pat. No. 3,056,487 (KIPPER) includes a transfer screw and a trough containing the transfer screw. The screw pitches vary according to a law of continuous variation.

However, the screw conveyor described in U.S. Pat. No. 3,056,487 (KIPPER) is not suitable for being installed in a complex plant to convey an aerated powdery material, e.g. a mixture of powdery cement and air (or any other suitable gas). In particular, this screw conveyor is not suitable because it does not allow an optimal filling of the spires of the transfer screw during the filling step, on the one hand, and during the accelerating and launching step, on the other.

Therefore, the technical solution proposed by the present invention intends to overcome the aforementioned disadvantages.

DISCLOSURE OF INVENTION

The main aim of the present invention is therefore providing a screw conveyor to convey an aerated powdery material in which power waste is minimized by carefully designing the various screw portions in the screw conveyor, in particular by carefully selecting for each screw portion the law regulating the pitch variations of the points belonging to that particular screw portion.

Therefore, the present invention provides a screw conveyor to convey a powdery material according to claim 1 or according to any of the claims, directly or indirectly, dependent on claim 1.

In particular, in a "transfer screw portion" of the powdery material, the pitches of the various points belonging to that "transfer screw portion" vary more than the pitches of the points belonging to an "extraction screw portion" which is "upstream" of said "transfer screw portion" in the direction of advancement of the material.

In such a way, as better disclosed in the following, the density of the material decreases (rarefaction) while passing from the "transfer screw portion" to the "extraction screw portion".

The gradual increase of the pitch of the points belonging to a same screw portion greatly reduces the advancement resistance of the material, because there are no longer agglomerated and compact fine particles that must slide on the screw to advance, but rather thin and rarefied fine particles that must instead be pushed.

Moreover, the increase of the pitch of the points belonging to an "accelerating and launching screw portion" of the powdery material must be even sharper, such "accelerating and launching screw portion" being downstream of the aforementioned "transfer screw portion".

In fact, the power of the quasi-fluid given by the intimate mixing of the particles with the gas (air, nitrogen, carbon dioxide, etc.) at the end of the "accelerating and launching screw portion" should easily overcome any intermediate, screwless support of the screw conveyor.

Furthermore, as shown in a particular embodiment of the present invention, an "anti-siphon screw portion" is preferably inserted between the "transfer screw portion" and the "accelerating and launching screw portion" to avoid what is called a "siphon effect", said anti-siphon screw portion showing a sudden and momentary reduction of the pitches of the points belonging to that screw portion.

The "siphon effect" takes place when the effective flow rate of the screw conveyor is greater than the one that had been calculated and was theoretically possible. Such a phenomenon occurs with fluids or quasi-fluids, by their very nature or because they are fluidized. Thus, the fluidized material has a high flowability and inertia and inadvertently tends to leak from the screw conveyor; and even when the plant stops, the fluidized material keeps inadvertently leaking from the plant by inertia.

This problem is also related to the slope of the screw conveyor. In particular, the larger the sloping angle of the screw conveyor, the less the "siphon effect".

As previously mentioned, the siphoning of the fluidized material in a precise stretch of the screw conveyor can be avoided by reducing the pitch, thus creating a kind of "product accumulation" (essentially a kind of "plug" of material) to increase the filling level of the device.

It has been experimentally found that a variation of the pitch of the points within a given screw portion of the screw conveyor maximizes the transport efficiency and significantly reduces the amount of power consumed for the transport.

Therefore, the object of the present invention is a screw conveyor to convey a powdery material, in particular cement. The screw conveyor includes:

a transfer screw; and a trough containing the screw; the trough being provided with an inlet section and an outlet section of the powdery material.

The screw conveyor is characterized in that the screw comprises:

at least a first screw portion having a first law of continuous variation of the screw pitches, which can be graphically represented by means of a first function having in at least one stretch a first derivative other than zero; and at least a second screw portion having a second law of continuous variation of the screw pitches, which can be graphically represented by means of a second function having in at least one stretch a first derivative other than zero. The first law of continuous variation of the pitches is different from the second law of continuous variation of the pitches.

In other words, a first graphically representable function corresponds to a first law of continuous variation of the screw pitches, while a second function, which is also graphically representable, corresponds to a second law of continuous variation of the screw pitches.

BRIEF DESCRIPTION OF THE DRAWINGS

For a better understanding of the present invention, some embodiments will be now described, three of them referring to the prior art and the other two referring to the present invention, in which.

BEST MODE FOR CARRYING OUT THE INVENTION

Incidentally, the axial distance (along a longitudinal symmetry axis of the screw) separating any point of the crest from its homologue on the next crest will here be defined as the "pitch" of a point of the screw crest (PTC). Furthermore, a "screw portion" (SEC) indicates any portion of a screw possibly wound around a central tube with the same law of variation of the pitches of the points; said law of variation of the pitches of the points being representable by a function having at any point a first derivative other than zero.

Moreover, in this context, the term "stretch" indicates a "span" within the aforementioned "screw portion" (SEC).

Furthermore, as already known from the Fermat's theorem on stationary points, in any function, the first derivative is equal to zero when the tangent is horizontal; i.e. at maximum points, at minimum points or at inflection points with a horizontal tangent.

Figure 1:
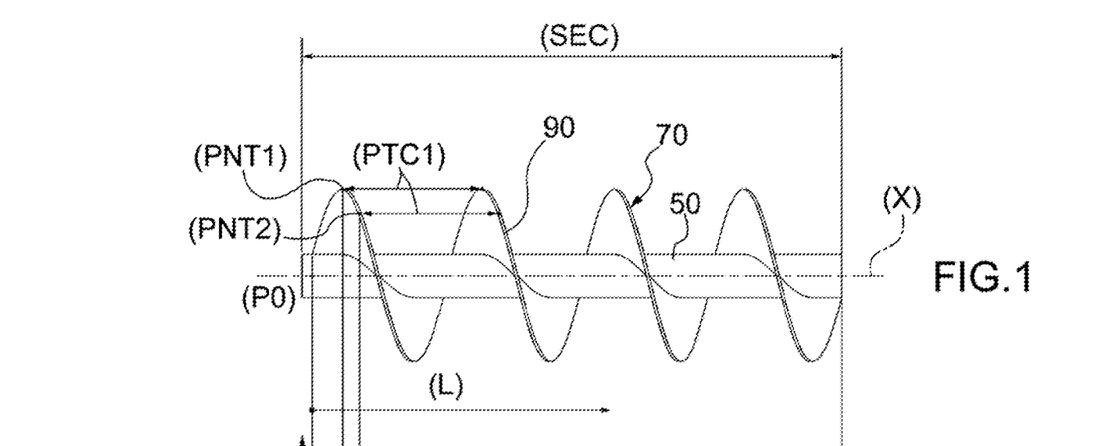
FIG. 1 (with the relative graph of FIG. 1a) schematically shows a longitudinal section of a screw portion of a screw having a constant pitch (prior art)
Figure 1A:
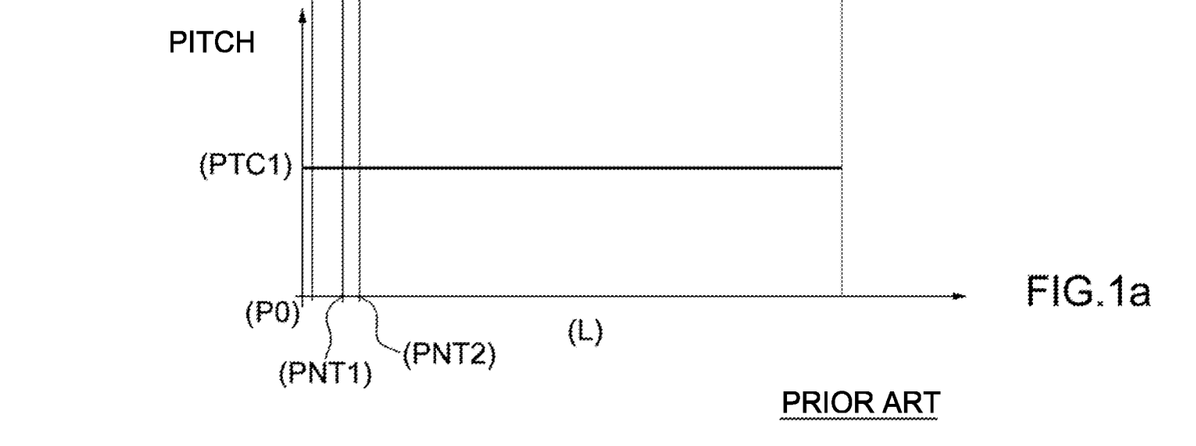

In the first example referring to the prior art, shown in FIG. 1 and in the corresponding graph of FIG. 1a, any point (PNT1) of a screw 70 has a pitch (PTC1) equal to the pitch of another point (PNT2) close to it (where (L) is the generic distance of any point of the screw 70 from a starting point (P0) (point zero)).

In more detail, the graph of FIG. 1a graphically shows the law of variation of the pitch (in this case constant) of the screw by taking the longitudinal symmetry axis (X) as the axis of the abscissas and by taking the axis of the values of the pitches as the axis of the ordinates.

Therefore, in this case, the "law of variation of the pitches of the points" is represented by a straight line on the axis of the ordinates, parallel to the axis of the abscissas (i.e. the longitudinal symmetry axis (X) of the screw 70), the straight line indicating in the present case the constancy of the value of the pitch (PTC) at any point (PNT1) (PNT2) of the screw 70.

If, on the other hand (FIG. 2 and relative graph of FIG. 2a—prior art), there is a discrete passage from a "first screw portion" (SEC1) of the screw 70 to a "second screw portion" (SEC2) (always of the screw 70), this means that there is a passage from a pitch (PTC1) of all the points belonging to the first screw portion (SEC1) to a pitch (PTC2) of all the points belonging to the second screw portion (SEC2); and this is the situation actually described and shown in EP-A2-0 816 938 (MITA INDUSTRIAL CO. LTD).

Figure 2:
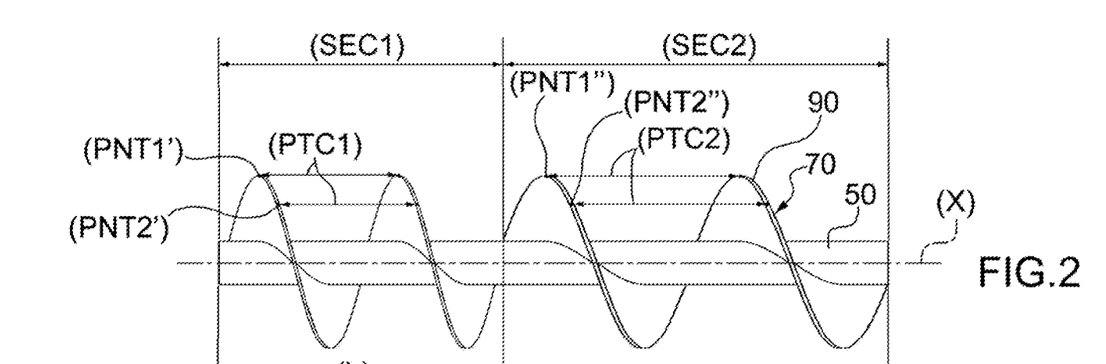
FIG. 2 (with the relative graph of FIG. 2a) schematically shows a longitudinal section of a screw portion having a pitch varying according to a step function (prior art)

Thus, as shown in FIG. 2, always referring to a prior art case, there is a first "law of variation of the pitches of the points" represented by a first straight line, parallel to the axis of the abscissas (graph of FIG. 2a), indicating the constancy of the value of the pitch (PTC1) at any point (PNT1'), (PNT2') of the "first screw portion" (SEC1) of the screw 70.

Moreover, always in FIG. 2 (prior art), there is a second "law of variation of the pitches of the points" represented by a second straight line, parallel to the axis of the abscissas (graph of FIG. 2a), indicating the constancy of the value of the pitch (PTC2) at any point (PNT1"), (PNT2") of the "second screw portion" (SEC2) of the screw 70.

Figure 2A:
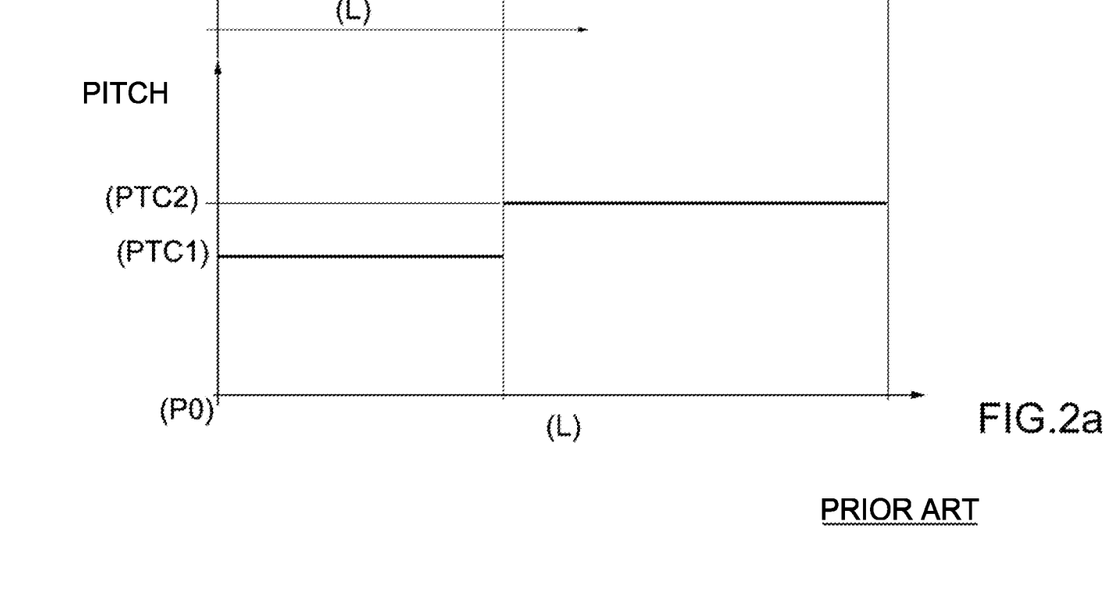

Incidentally, also the graph of FIG. 2a graphically represents the law of variation of the screw pitches by taking the longitudinal symmetry axis (X) of the screw as the axis of the abscissas and the axis of the values of the pitches as the axis of the ordinates.

Figure 3:
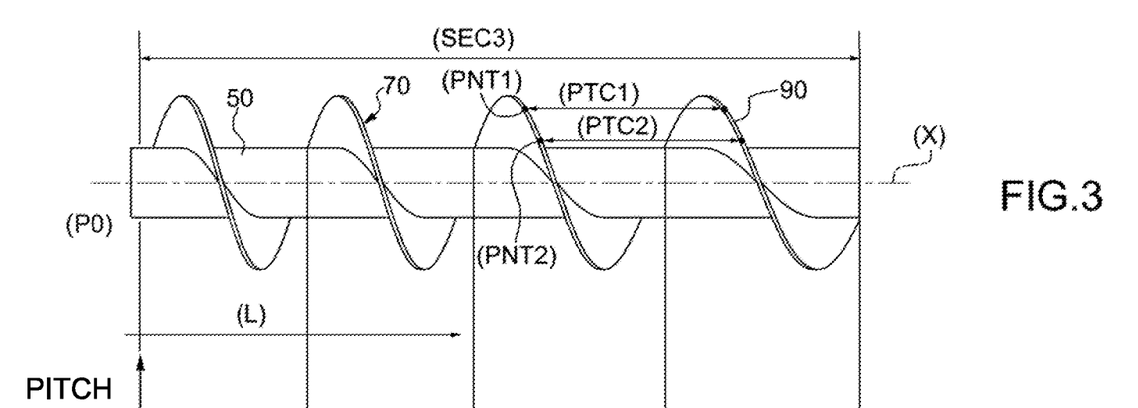
FIG. 3 (with the relative graph of FIG. 3a) schematically shows a longitudinal section of a screw portion having a pitch continually varying according to an sloping straight line or a curve (prior art)
Figure 3A:
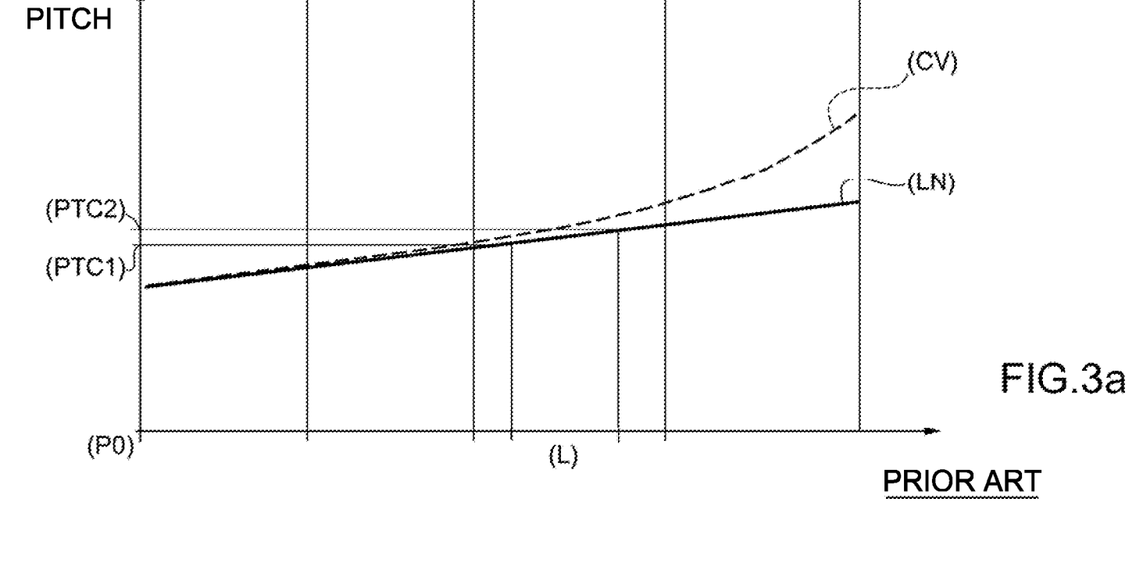

FIG. 3 and the corresponding graph of FIG. 3a, referring to a third case always belonging to the prior art, show a situation in which a screw portion (SEC3) has a same law of variation of the pitches (PTC) of the single points (PNTs) forming the screw 70.

Also the graph of FIG. 3a graphically represents the law of variation of the screw pitches by taking the longitudinal symmetry axis (X) as the axis of the abscissas and the axis of the values of the pitches as the axis of the ordinates.

As already known, speed variation (acceleration) can be proportional to time (uniformly accelerated motion) or can be bound to the square of time (see below) or to other types of functions.

If therefore, as shown in FIG. 3 and in the graph of FIG. 3a, the central tube 50 is subjected to an acceleration along the direction of advancement, any first point (PNT1) of the screw portion (SEC3) will have a pitch (PTC1) other (in this case smaller) than the pitch (PTC2) of a second point (PNT2) (adjacent to the first point (PNT1)) belonging to the same screw portion (SEC3).

In other words, the two points (PNT1) and (PNT2) belonging to the same screw portion (SEC3) only share the law of speed variation (acceleration) of the central tube 50 when the screw 70 winds around it in the building phase. This results in a pitch difference, point by point, in the same screw portion (SEC3).

Obviously, when normally using the screw for conveying powdery material or grains, all points belonging to the crest of a given screw portion have the same angular speed and the same tangential speed since they have the same distance from the axis (X).

Therefore, a so-called "structural" aspect of the screw, as described above, must be distinguished from a "functional" aspect of the screw when it is actually mounted in a screw conveyor.

In short, FIG. 3a shows a straight line (LN) when the variation of the pitch for each point belonging to the same screw portion (SEC3) is constant, or a curved line (CV) when the variation of the pitch for each point belonging to the same screw portion (SEC3) increases (or decreases), e.g. with the square of the distance between the screw point and a starting point (P0) (point zero).

Figure 4:
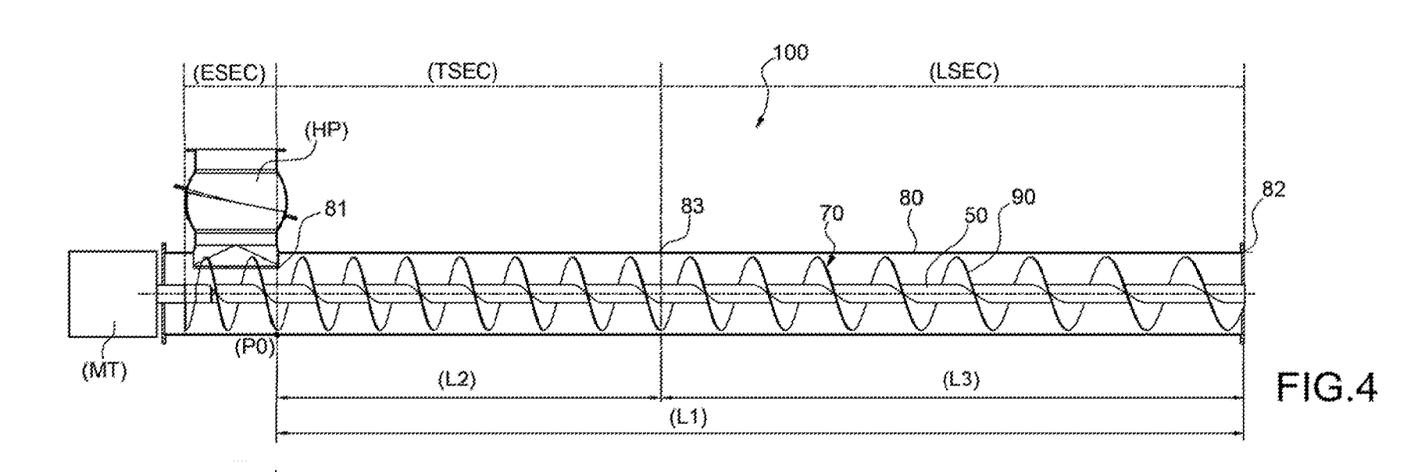
FIG. 4 (with the relative graph of FIG. 4a) schematically shows a longitudinal section of a first embodiment of a screw conveyor made according to the teaching of the present invention.

FIG. 4 indicates with the reference number 100 as a whole a first embodiment of a screw conveyor to convey a powdery material made according to the teaching of the present invention.

The screw conveyor 100 comprises a spiral blade 90 of a screw 70 wound around the central tube 50 and contained in an outer trough 80 provided with an inlet section 81 and an outlet section 82 of the fluidised powdery material; these sections are known with respect to the state of the art.

Incidentally, exactly at a loading mouth (HP) of the screw conveyor 100, there is a screw portion (ESEC) for the extraction of the powdery material, but it will not be analysed in detail in the present description because it is of a known type.

In use, the present screw conveyor 100 creates a suction depression.

The inlet section 81 is therefore the first cross section immediately after the hopper unloading mouth (HP).

The screw 70 is rotated by an electric motor (MT).

Constructively, the screw 70 made according to the teaching of the present invention is obtained by means of a rototranslating motion of a central tube 50 (around and/or along the longitudinal symmetry axis (X) of the screw 70) and winding around it a spiral blade 90.

In this case, the longitudinal symmetry axis (X) of the screw 70 is the same as the longitudinal symmetry axis of the central tube 50.

Moreover, in the present invention, the central tube 50 has a certain law of acceleration along the axis (X).

In the present invention, the laws of acceleration of the central tube 50 vary by passing from a "screw portion" (SEC) to the other, while always and in any case using a same spiral blade 90 for the same screw 70.

Figure 4A:
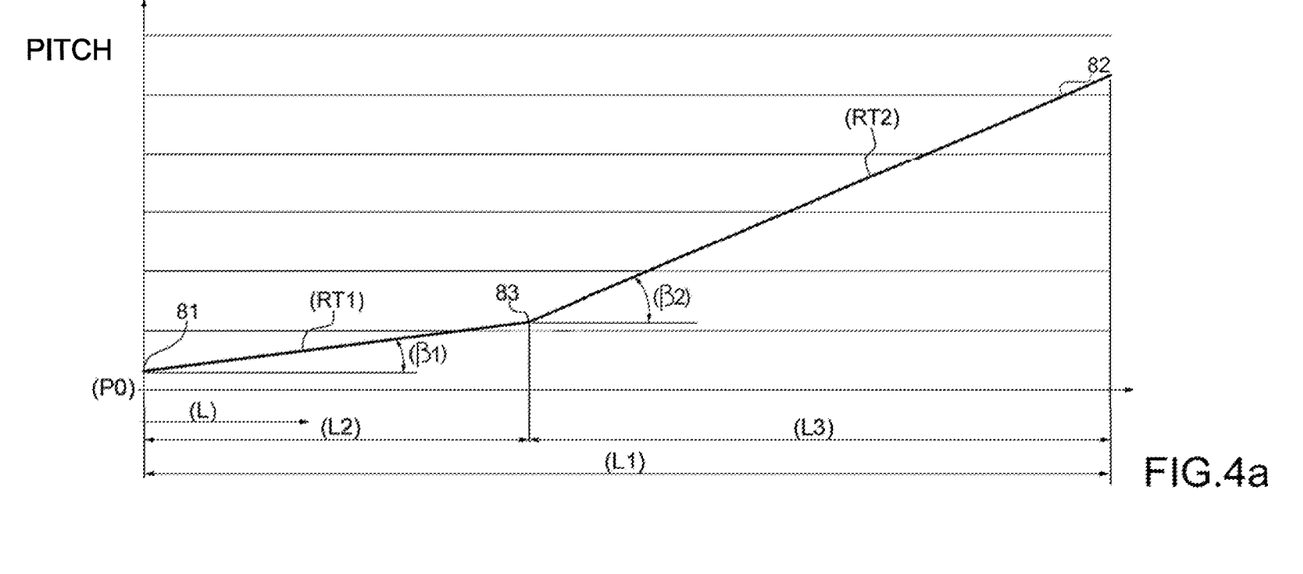

The first embodiment shown in FIGS. 4 and 4a, having a total length of the screw conveyor (L1) (from the inlet section 81 to the outlet section 82), shows the following two different screw portions 70 (other than the aforementioned extraction screw portion (ESEC), whose width substantially coincides with the width of the loading mouth (HP)):

a first transfer screw portion (TSEC) having a length (L2) and extending between the inlet section 81 and an intermediate section 83; the first transfer screw portion (TSEC) having, in a preferred embodiment, a continuously increasing pitch (according to a first law of variation), thus having a first derivative other than zero; and a second accelerating and launching screw portion (LSEC) having a length (L3) and extending, in turn, from the intermediate section 83 to the outlet section 82; the second accelerating and launching screw portion (LSEC) having, in a preferred embodiment, a continuously varying pitch (according to a first law of variation), thus having a first derivative other than zero.

Generally, the laws of variations of the pitches of the points belonging to the portions (TSEC) and (LSEC) are different.

Moreover, the two portions (TSEC) and (LSEC) of the same screw 70 are advantageously made by using the same preferably metal spiral blade 90 wound around the same central tube 50.

However, the screw 70 according to the invention can be also manufactured through a moulding process or the like. In fact, as shown in FIG. 4*a*, the progress of the pitches based on the distance of the point of the screw crest with respect to a starting point (P0) (point zero) can be represented by a broken line with two sloping segments (RT1) and (RT2); in which the sloping segment (RT1) corresponds to the respective screw portion (TSEC), whereas the sloping segment (RT2) corresponds to the respective screw portion (LSEC), the one being the continuation of the other.

Also the graph of FIG. 4*a* graphically shows the law of variation of the screw pitches by taking the longitudinal symmetry axis (X) as the axis of the abscissas and the axis of the values of the pitches as the axis of the ordinates.

The slope (β2) of the sloping segment (RT2) is different from the slope (β1) of the sloping segment (RT1).

In this case, the slopes (β1), (β2) of the segment (RT1) and respectively of the segment (RT2) represent the so-called "first derivatives" of the two segments (RT1), (RT2) and such slopes (β1), (β2) are both other than zero.

In particular, advantageously but not necessarily, the slope (β2) of the sloping segment (RT2) is greater than the slope (β1) of the sloping segment (RT1) (FIG. 4*a*).

Figure 5:
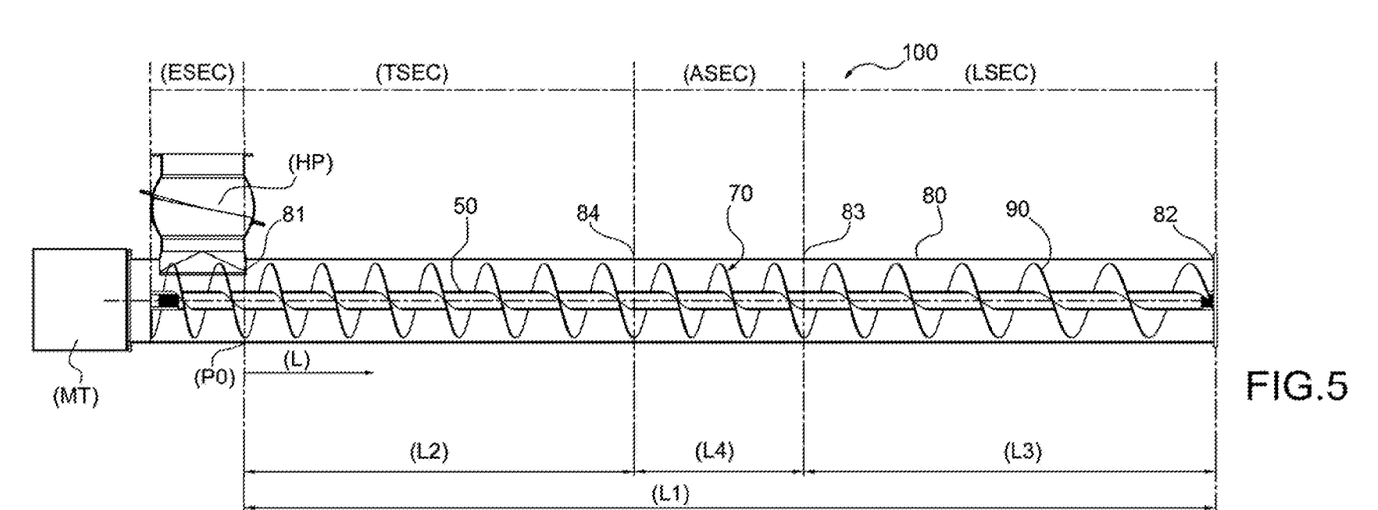
FIG. 5 (with the relative graph of FIG. 5a) schematically shows a longitudinal section of a second embodiment of a screw conveyor made according to the teaching of the present invention.
Figure 5A:
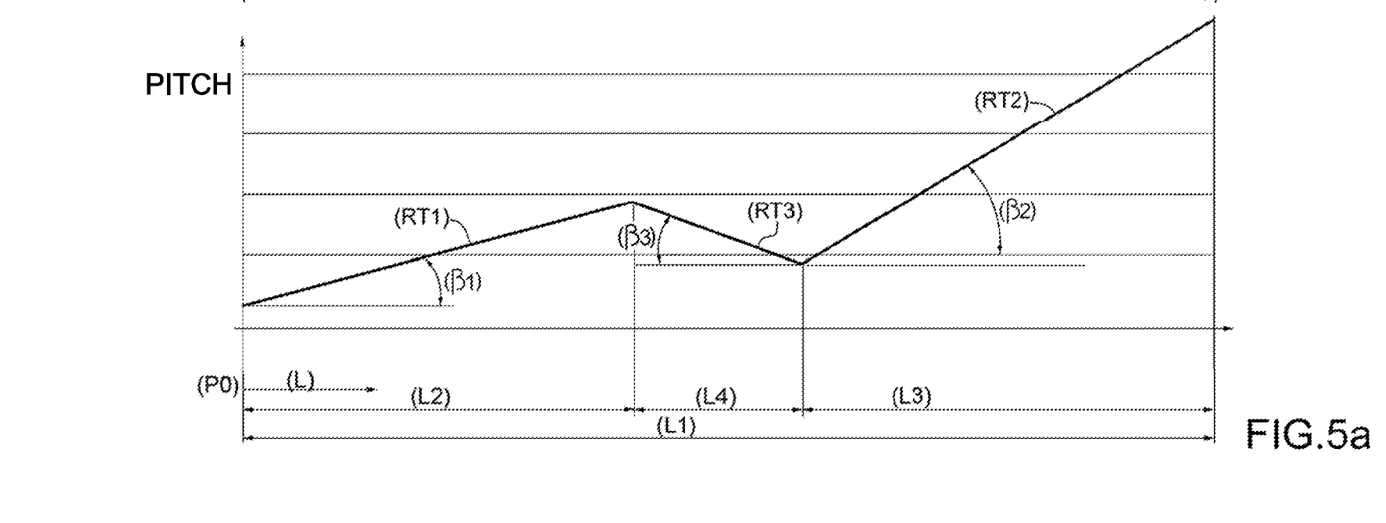

A second embodiment of the present invention shown in FIGS. 5, 5*a*, wherein the corresponding elements are indicated by the same numbers and symbols of FIGS. 4, 4*a*, shows the following different three screw portions 70 (other than the aforesaid extraction screw portion (ESEC), whose width substantially coincides with the width of the loading mouth (HP)):

a first portion of a transfer screw (TSEC) having a length (L2), substantially equal to the analogous first portion of FIGS. 4 and 4*a*;

a second accelerating and launching screw portion (LSEC), having a length (L3), substantially equal to the analogous second portion of FIGS. 4 and 4*a*; and a third anti-siphon screw portion (ASEC) having a length (L4); the third anti-siphon screw portion (ASEC) being comprised between the first transfer screw portion (TSEC) and the second accelerating and launching screw portion (LSEC); the third anti-siphon screw portion (ASEC) having a continuously decreasing pitch, point by point, and a decreasingly sloping angle (with a first derivative other than zero).

Also the graph of FIG. 5*a* graphically shows the law of variation of the screw pitches by taking the longitudinal symmetry axis (X) as the axis of the abscissas and the axis of the values of the pitches as the axis of the ordinates. Moreover, the three portions (TSEC), (LSEC) and (ASEC) of the same screw 70 are made using the same preferably metal spiral blade 90 wound around the same central tube 50.

Thus, in the second embodiment (FIGS. 5, 5*a*), also providing the anti-siphon screw portion (ASEC) (defined by the intermediate sections 83 and 84) between the first sloping segment (RT1) having a sloping angle (β1) (with a first derivative other than zero) and the second sloping segment (RT2) having a sloping angle (β2) (with a first derivative other than zero), there is a third sloping segment (RT3) with a third sloping angle (β3) (with a first derivative other than zero) and having an opposite direction with respect to the sloping angles (β1) and (β2). In this case, the slopes (β1), (β2), (β3) of the three segments (RT1), (RT2), (RT3) represent the so-called "first derivatives" of the three segments (RT1), (RT2) and (RT3) and said slopes (β1), (β2) and (β3) are all other than zero.

In a further non-shown embodiment, the first law of variation of the screw pitches (PTC) is a linear law (corresponding to a function, which can be graphically represented by a sloping segment) whereas the second law of variation of the screw pitches (PTC) is a curved law (corresponding to a function which can be graphically represented by a curve).

Two adjacent portions (TSEC), (ASEC), (LSEC) can be continuously connected without cusps in the joining areas.

This technical solution allows a further improvement of the efficiency of the device also avoiding the turbulence generated by sudden pitch jumps between different screw portions.

The main advantage of the screw conveyor object of the present invention is the fact that, at the same flow rate of powdery material, there is less power consumption (e.g. electric power consumed by the motor (MT)) to rotate the transfer screw.

An additional advantage of the present screw conveyor is the fact that it works more efficiently even when it has a certain slope with respect to the ground. For example, these screw conveyors maintain high yields even with sloping angles relative to the ground greater than 35°.

The invention claimed is:
1. A screw conveyor (100) to convey a powdery material, in particular cement; said screw conveyor (100) comprising:
a transfer screw (70); and
a trough (80) containing said transfer screw (70); said trough (80) being provided with an inlet section (81) and an outlet section (82) for the powdery material; characterized in that said transfer screw (70) comprises:
at least a first screw portion ((TSEC); (ASEC)) having a first law of continuous variation of the pitches (PTC) of the transfer screw (70), which can be graphically represented by means of a first function having in at least one stretch a first derivative other than zero; and
at least a second screw portion ((LSEC); (ASEC)) having a second law of continuous variation of the pitches (PTC) of the transfer screw (70), which can be graphically represented by means of a second function having in at least one stretch a first derivative other than zero; said first law of continuous variation of the pitches (PTC) being different from said second law of continuous variation of the pitches (PTC);
at least one transfer screw portion (TSEC) having a length (L2), which extends between an inlet section (81) and an intermediate section (83) of said trough (80); the transfer screw portion (TSEC) having a continuously increasing pitch, point by point; and
at least one accelerating and launching screw portion (LSEC) having a length (L3), which extends from the intermediate section (83) to an outlet section (82) of said trough (80); the accelerating and launching screw portion (LSEC) having a continuously increasing pitch; the laws of variation of the pitches of the points belonging to the screw portions (TSEC) and (LSEC) being different from one another;

characterized in that the law of variation of the pitch, point by point, of said at least one transfer screw portion (TSEC) can be represented by a first straight line having a first sloping angle (β1), and in that the law of variation of the pitch, point by point, of said at least one accelerating and launching screw portion (LSEC) can be represented by a second straight line having a second sloping angle (β2) different from said first sloping angle (β1).

2. Screw conveyor (100), according to claim 1, characterized in that said first law of variation of the screw pitches (PTC) and said second law of variation of the screw pitches (PTC) are both different linear laws.

3. Screw conveyor (100), according to claim 1, characterized in that said first law of variation of the screw pitches (PTC) and said second law of variation of the screw pitches (PTC) are both different curved laws.

4. Screw conveyor (100), according to claim 1, characterized in that said first law of variation of the screw pitches (PTC) is a linear law and said second law of variation of the screw pitches (PTC) is a curved law.

5. Screw conveyor (100), according to claim 1, characterized in that (β2)>(β1).

6. Screw conveyor (100), according to claim 1, characterized in that at least one of the laws of variation of the pitch, point by point, of said at least one transfer screw portion (TSEC) or of said at least one accelerating and launching screw portion (LSEC) can be represented by a curve (CV).

7. Screw conveyor (100), according to claim 6, characterized in that the variation of the pitch, point by point, of said at least one transfer screw portion (TSEC) or of said at least one accelerating and launching screw portion (LSEC) increases with the square of the distance of the point of the screw from a starting point (P0).

8. Screw conveyor (100), according to claim 1, characterized in that two adjacent screw portions ((TSEC), (LSEC); (TSEC), (ASEC); (ASEC), (LSEC)) are continuously connected without cusps in the joining areas.

9. A screw conveyor (100) to convey a powdery material, in particular cement; said screw conveyor (100) comprising:
  a transfer screw (70); and
  a trough (80) containing said transfer screw (70); said trough (80) being provided with an inlet section (81) and an outlet section (82) for the powdery material; characterized in that said transfer screw (70) comprises:
    at least a first screw portion ((TSEC); (ASEC)) having a first law of continuous variation of the pitches (PTC) of the transfer screw (70), which can be graphically represented by means of a first function having in at least one stretch a first derivative other than zero; and
    at least a second screw portion ((LSEC); (ASEC)) having a second law of continuous variation of the pitches (PTC) of the transfer screw (70), which can be graphically represented by means of a second function having in at least one stretch a first derivative other than zero; said first law of continuous variation of the pitches (PTC) being different from said second law of continuous variation of the pitches (PTC);
    at least one transfer screw portion (TSEC) having a length (L2), which extends between an inlet section (81) and an intermediate section (83) of said trough (80); the transfer screw portion (TSEC) having a continuously increasing pitch, point by point; and
    at least one accelerating and launching screw portion (LSEC) having a length (L3), which extends from the intermediate section (83) to an outlet section (82) of said trough (80); the accelerating and launching screw portion (LSEC) having a continuously increasing pitch; the laws of variation of the pitches of the points belonging to the screw portions (TSEC) and (LSEC) being different from one another;
  characterized in that at least one anti-siphon screw portion (ASEC) having a length (L4) is provided between said at least one transfer screw portion (TSEC) and said at least one accelerating and launching screw portion (LSEC).

10. Screw conveyor (100), according to claim 9, characterized in that the law of variation of the pitch, point by point, of said at least one transfer screw portion (TSEC) can be represented by a first straight line having a first sloping angle (β1), and in that the law of variation of the pitch, point by point, of said at least one accelerating and launching screw portion (LSEC) can be represented by a second straight line having a second sloping angle (β2) different from said first sloping angle (β1) and characterized in that the law of variation of the pitch, point by point, of said at least one anti-siphon screw portion (ASEC) can be represented by a third straight line having a third sloping angle (β3) with an opposite direction relative to said two sloping angles (β1) and (β2).

* * * * *